May 25, 1965 E. H. H. GRAF ETAL 3,185,039
MACHINE FOR CONTINUOUS INTERNAL BROACHING
Filed Aug. 30, 1963 14 Sheets-Sheet 1
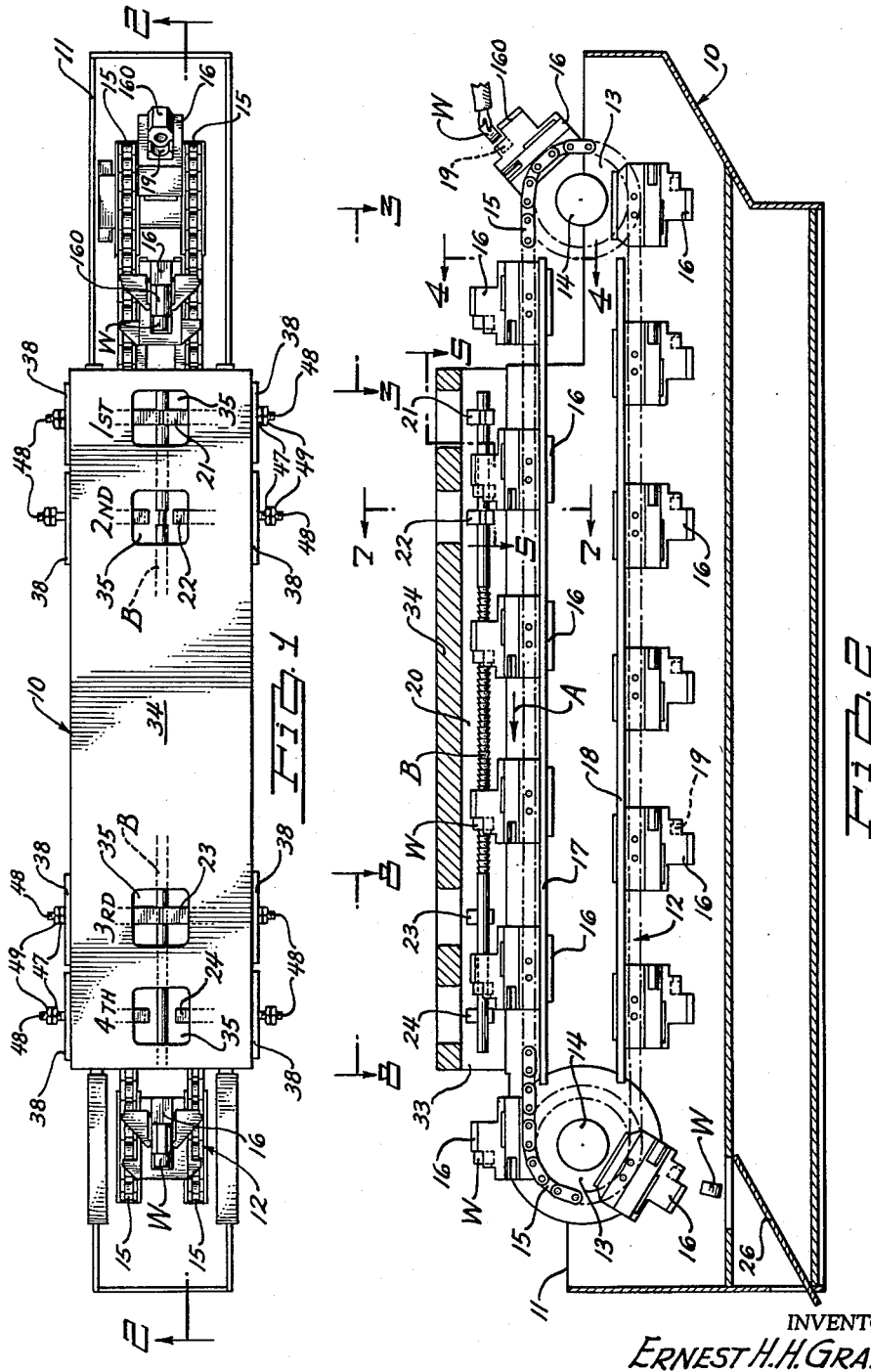
INVENTORS
ERNEST H.H. GRAF &
BY ALBERT E. J. RANDALL
ATTORNEY May 25, 1965   E. H. H. GRAF ETAL   3,185,039
MACHINE FOR CONTINUOUS INTERNAL BROACHING
Filed Aug. 30, 1963   14 Sheets-Sheet 2

INVENTORS
ERNEST H. H. GRAF &
BY ALBERT E. J. RANDALL

ATTORNEY

May 25, 1965 E. H. H. GRAF ETAL 3,185,039
MACHINE FOR CONTINUOUS INTERNAL BROACHING
Filed Aug. 30, 1963 14 Sheets-Sheet 3
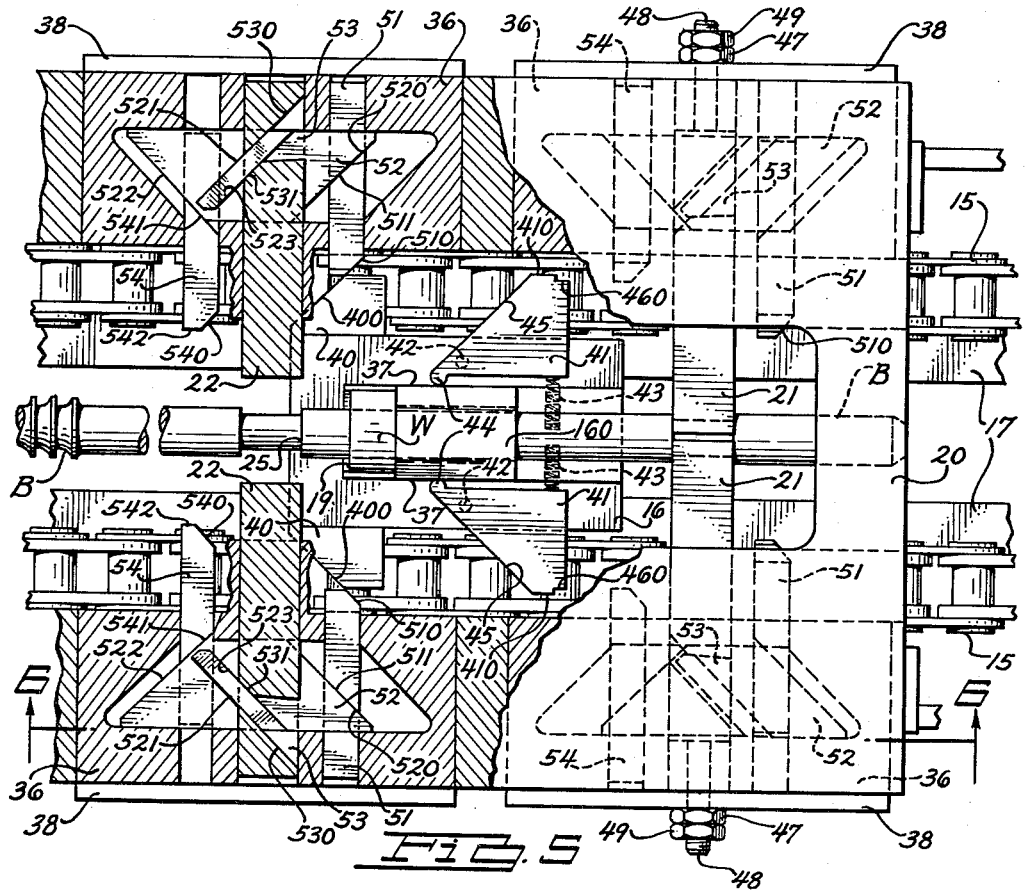
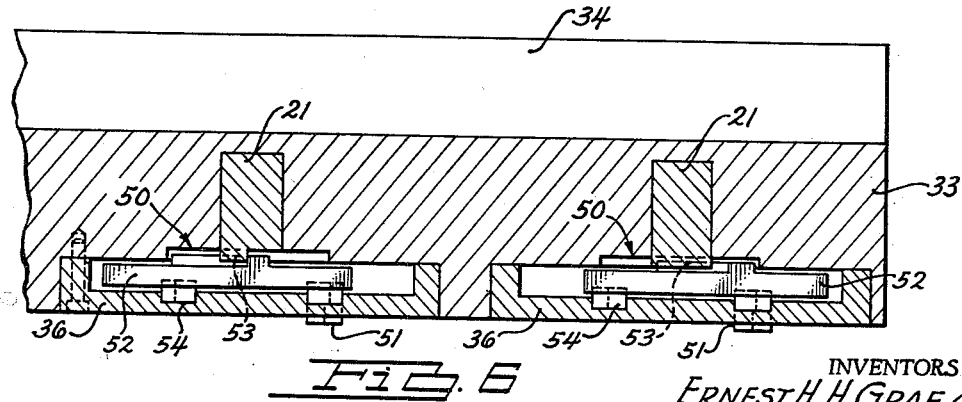
INVENTORS
ERNEST H. H. GRAF &
BY ALBERT E. J. RANDALL
ATTORNEY

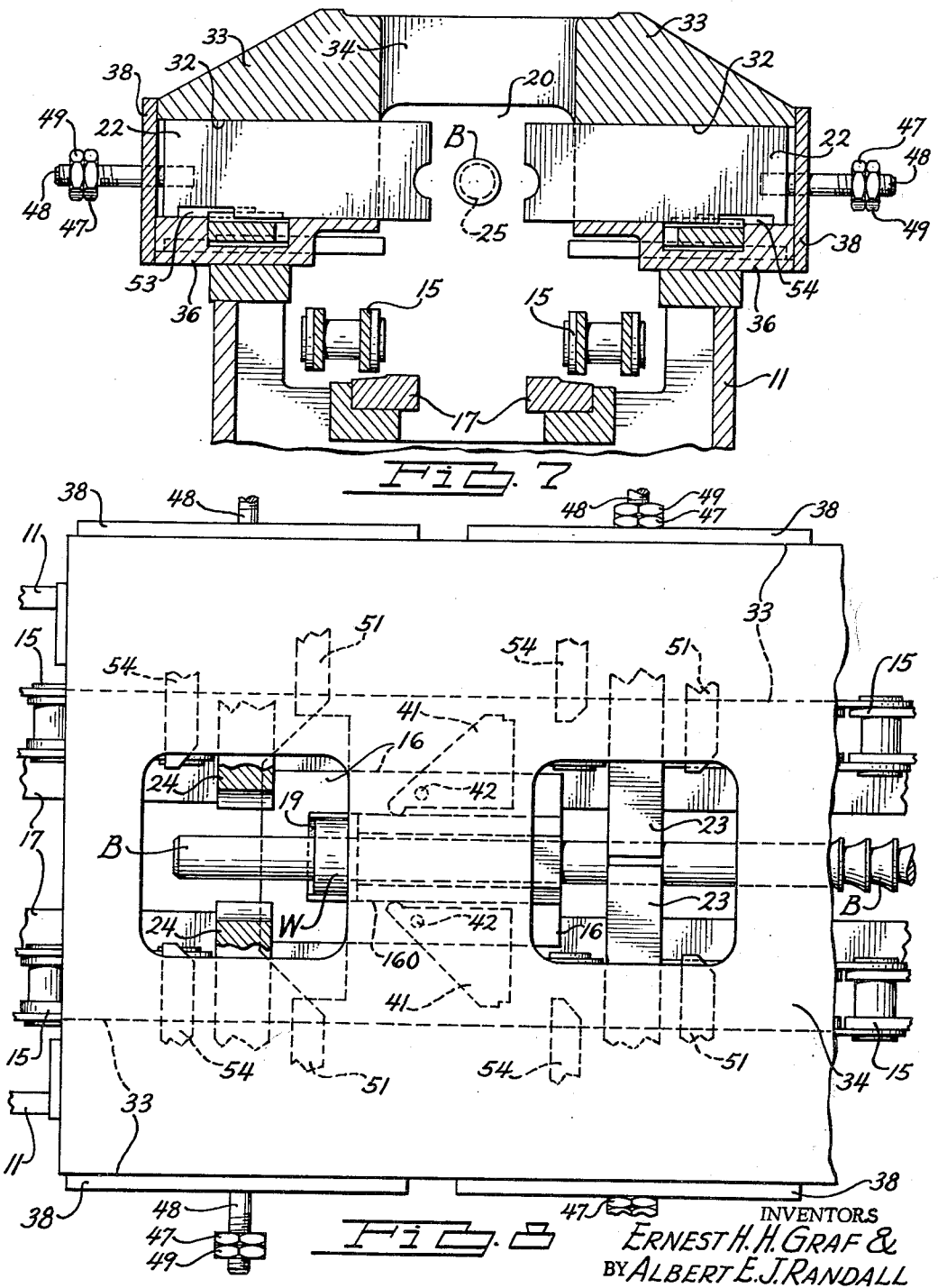

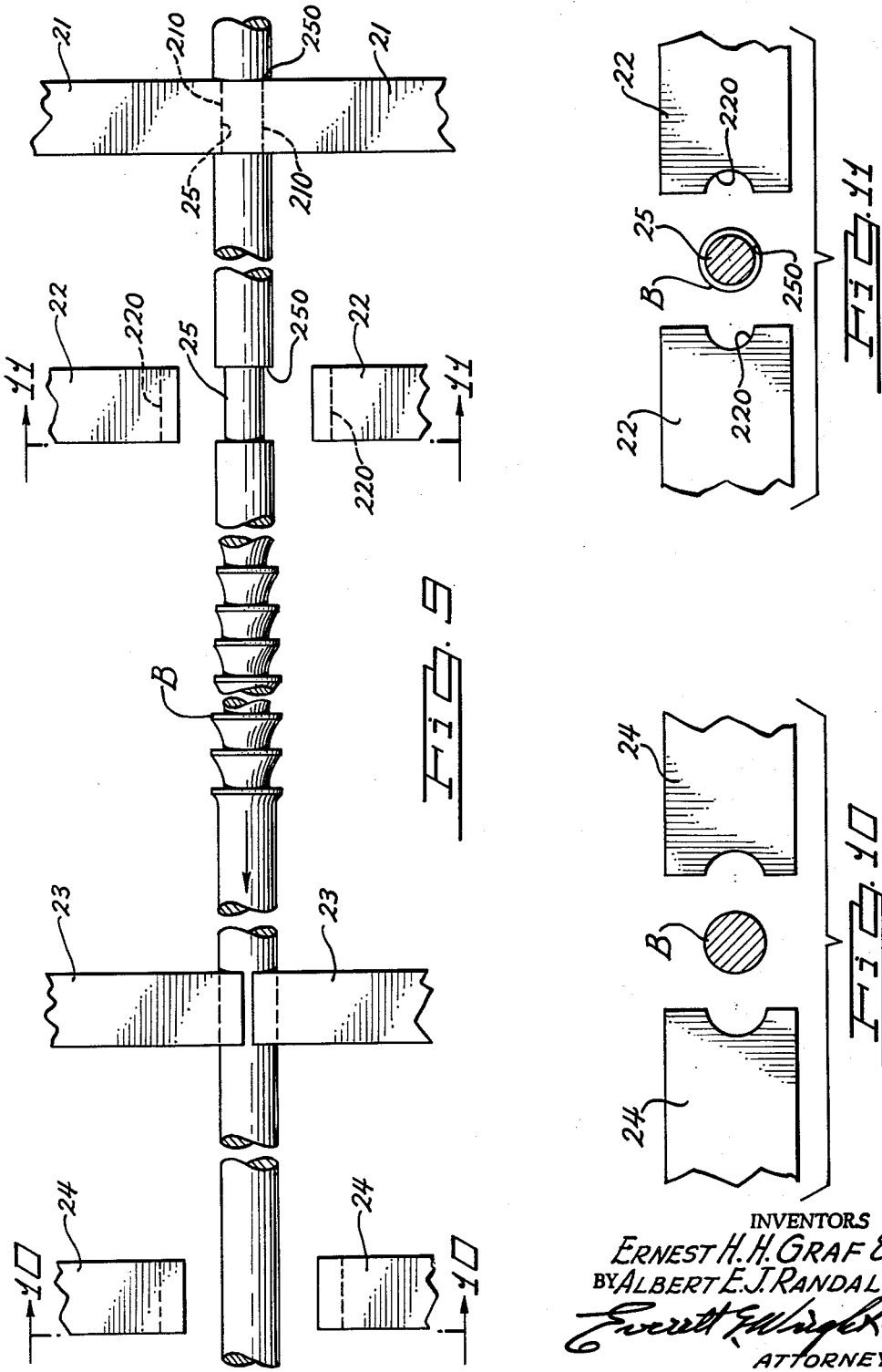

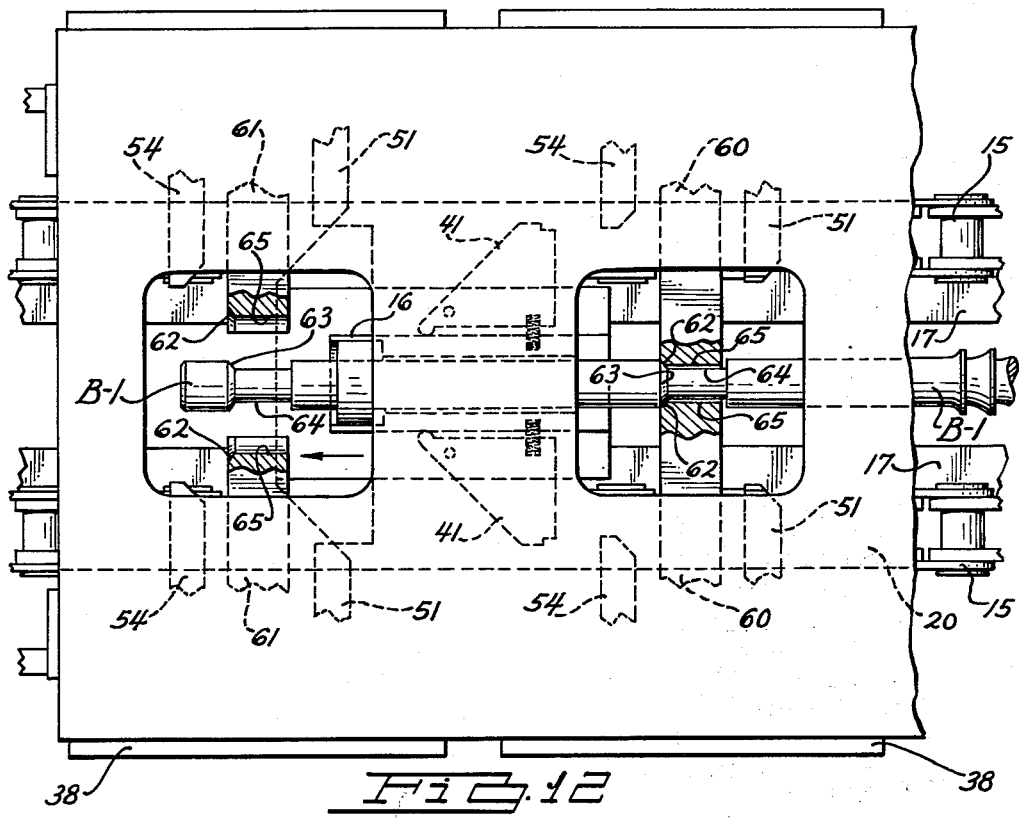
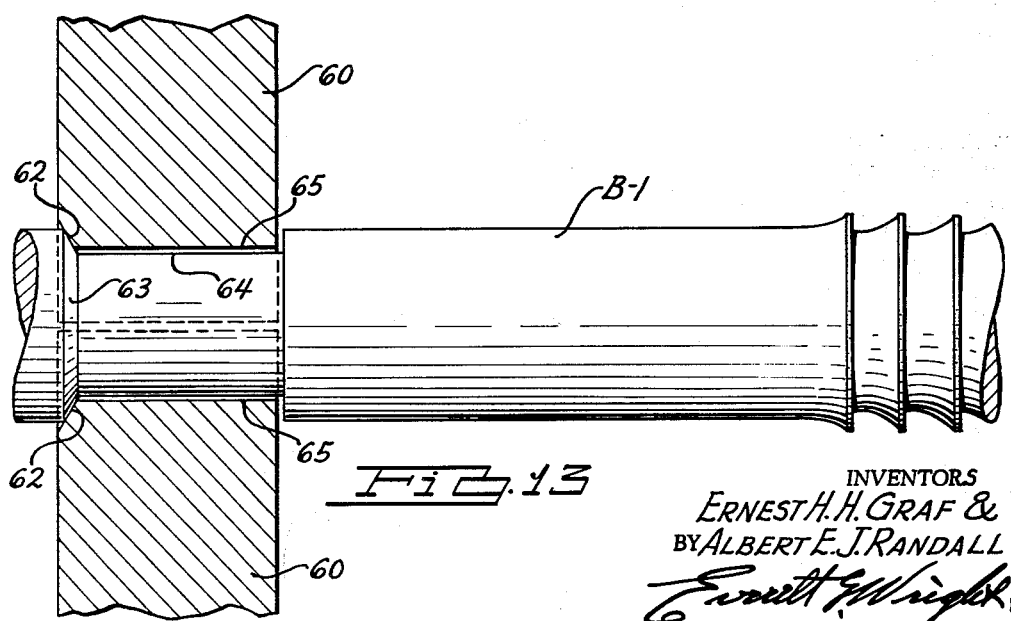

May 25, 1965   E. H. H. GRAF ETAL   3,185,039
MACHINE FOR CONTINUOUS INTERNAL BROACHING
Filed Aug. 30, 1963   14 Sheets-Sheet 7
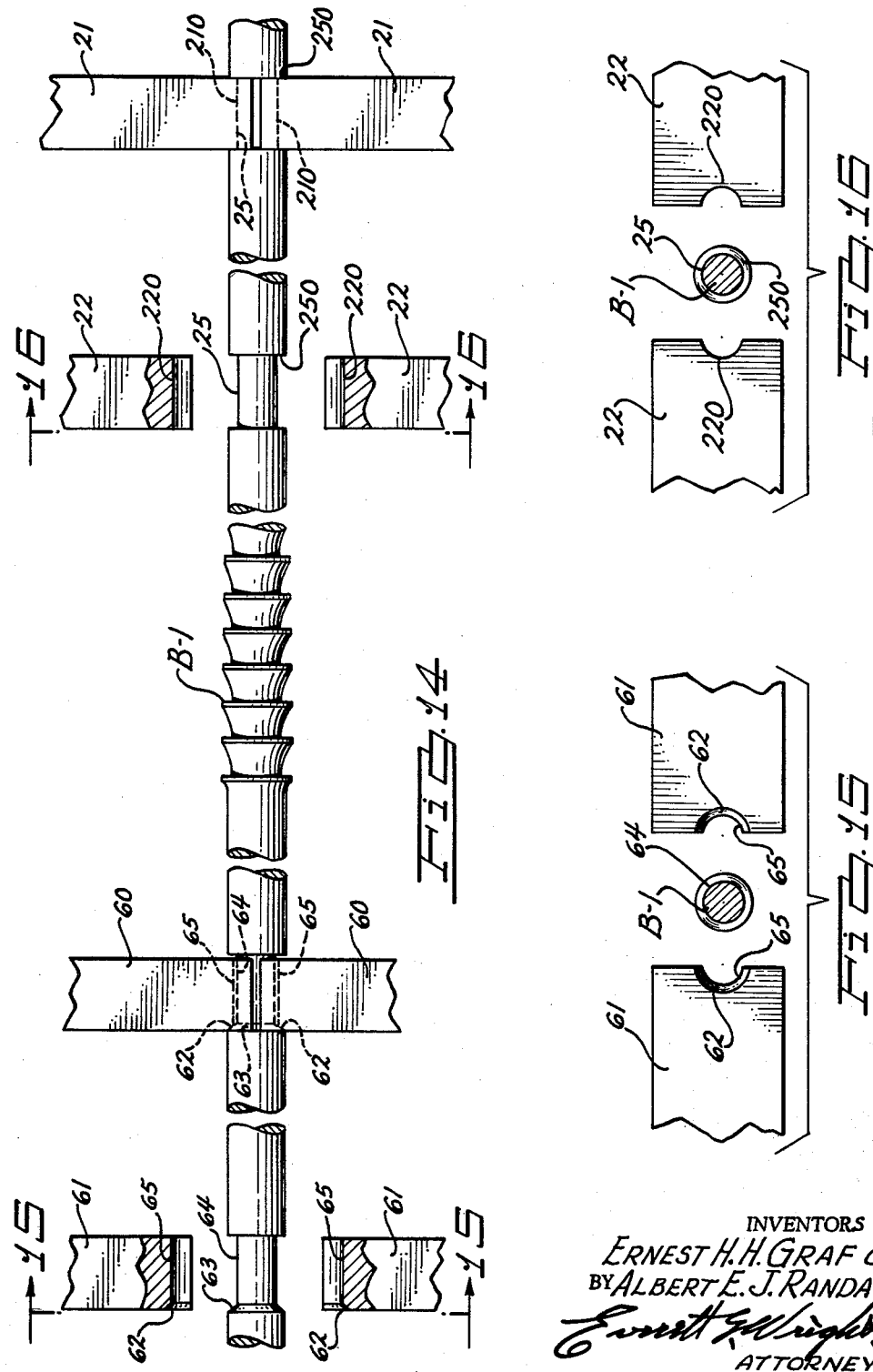
INVENTORS
ERNEST H. H. GRAF &
BY ALBERT E. J. RANDALL
ATTORNEY May 25, 1965     E. H. H. GRAF ETAL     3,185,039
MACHINE FOR CONTINUOUS INTERNAL BROACHING
Filed Aug. 30, 1963     14 Sheets-Sheet 8
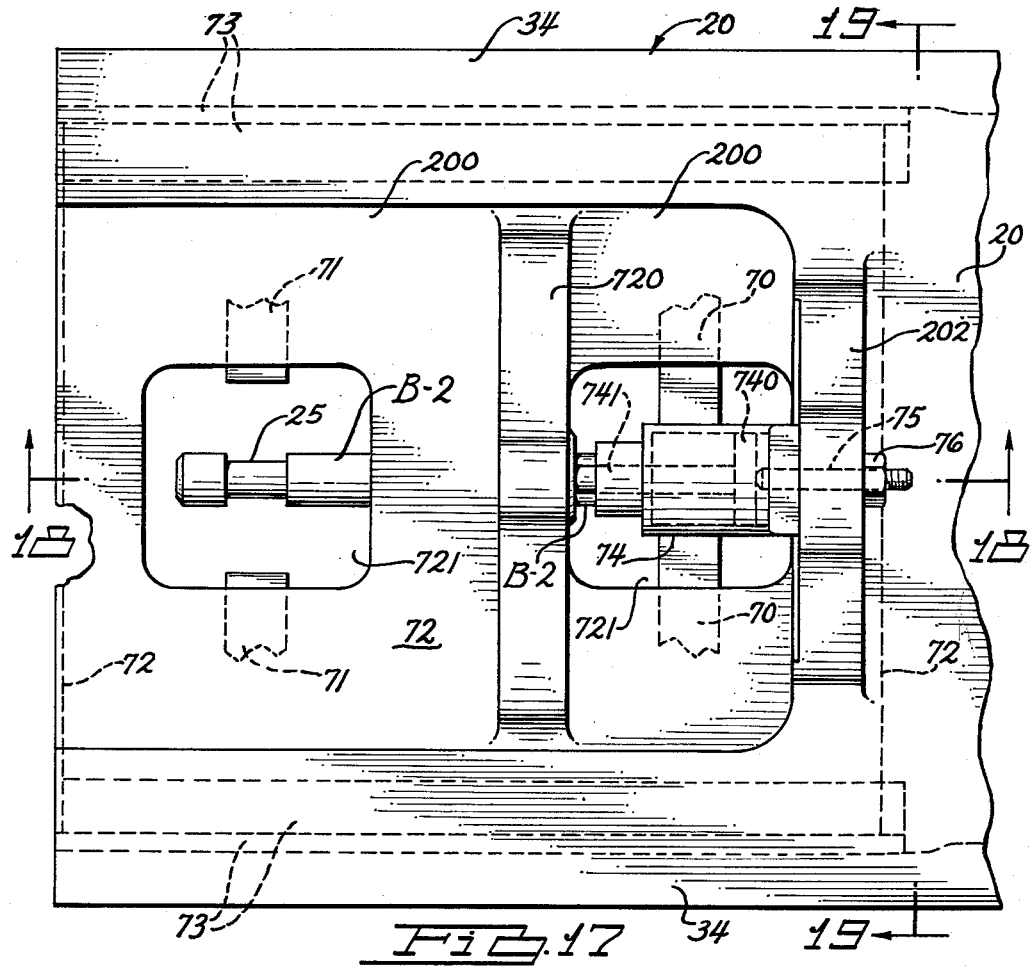
INVENTOR.
ERNEST H. H. GRAF &
BY ALBERT E. J. RANDALL
ATTORNEY

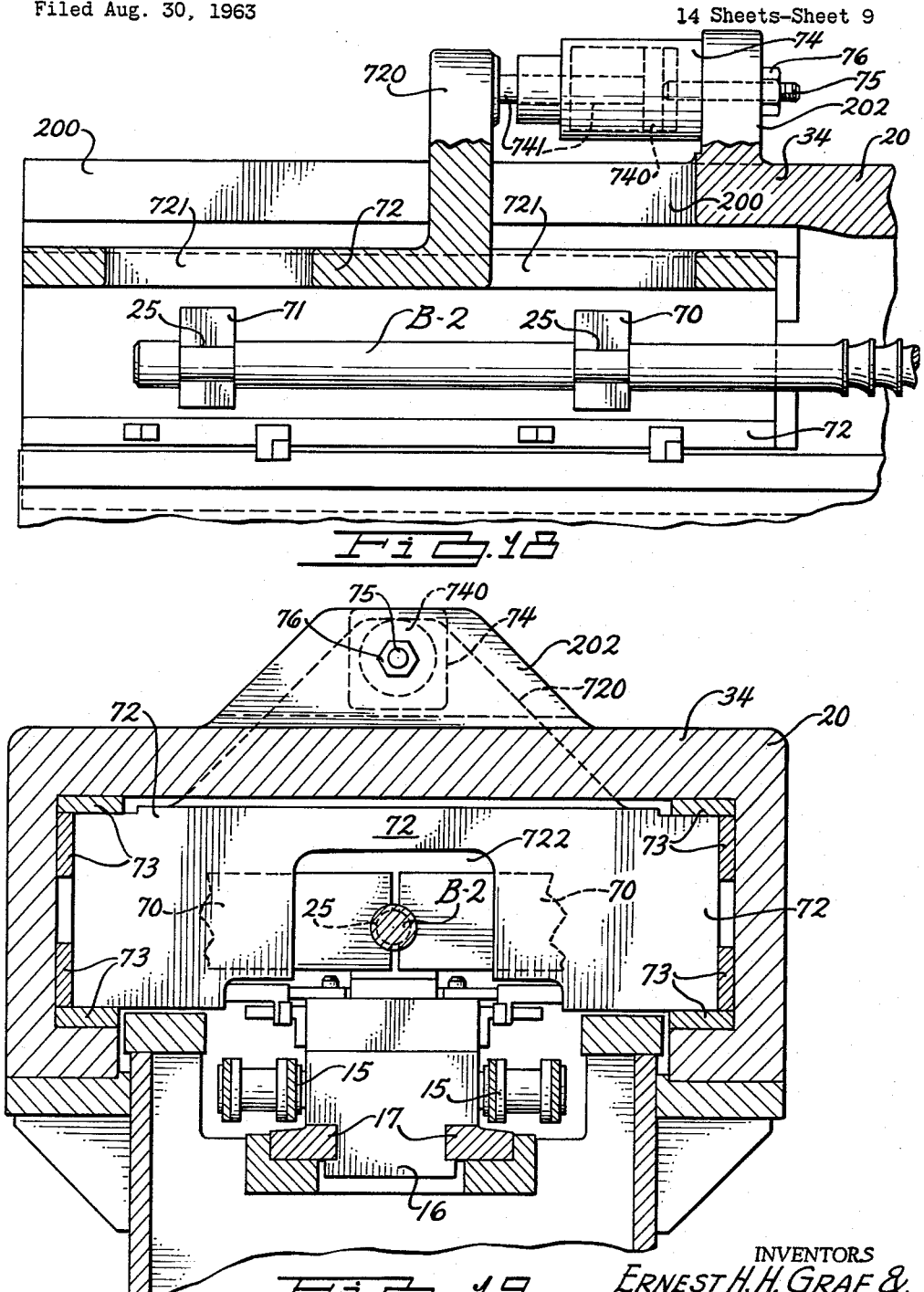

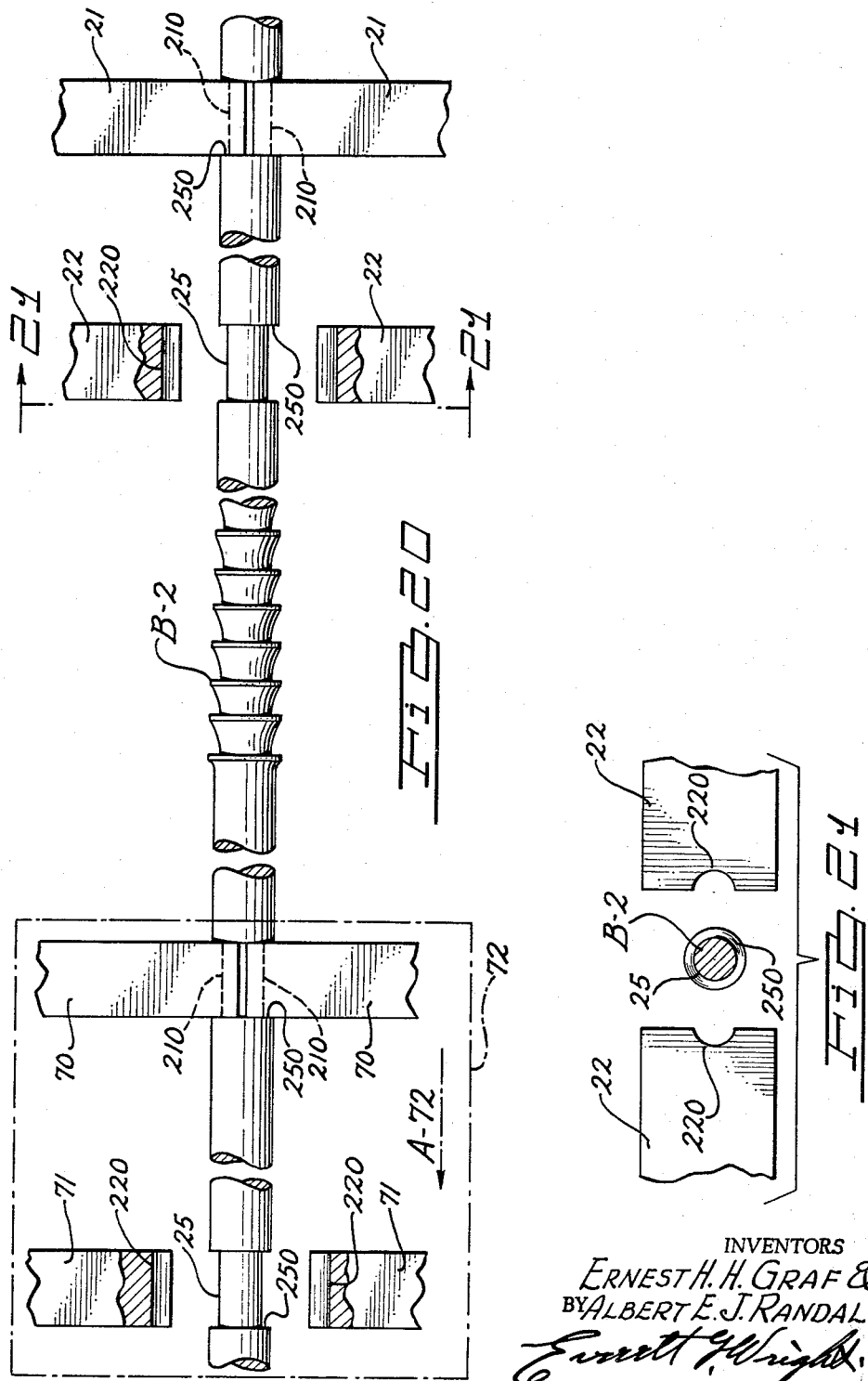

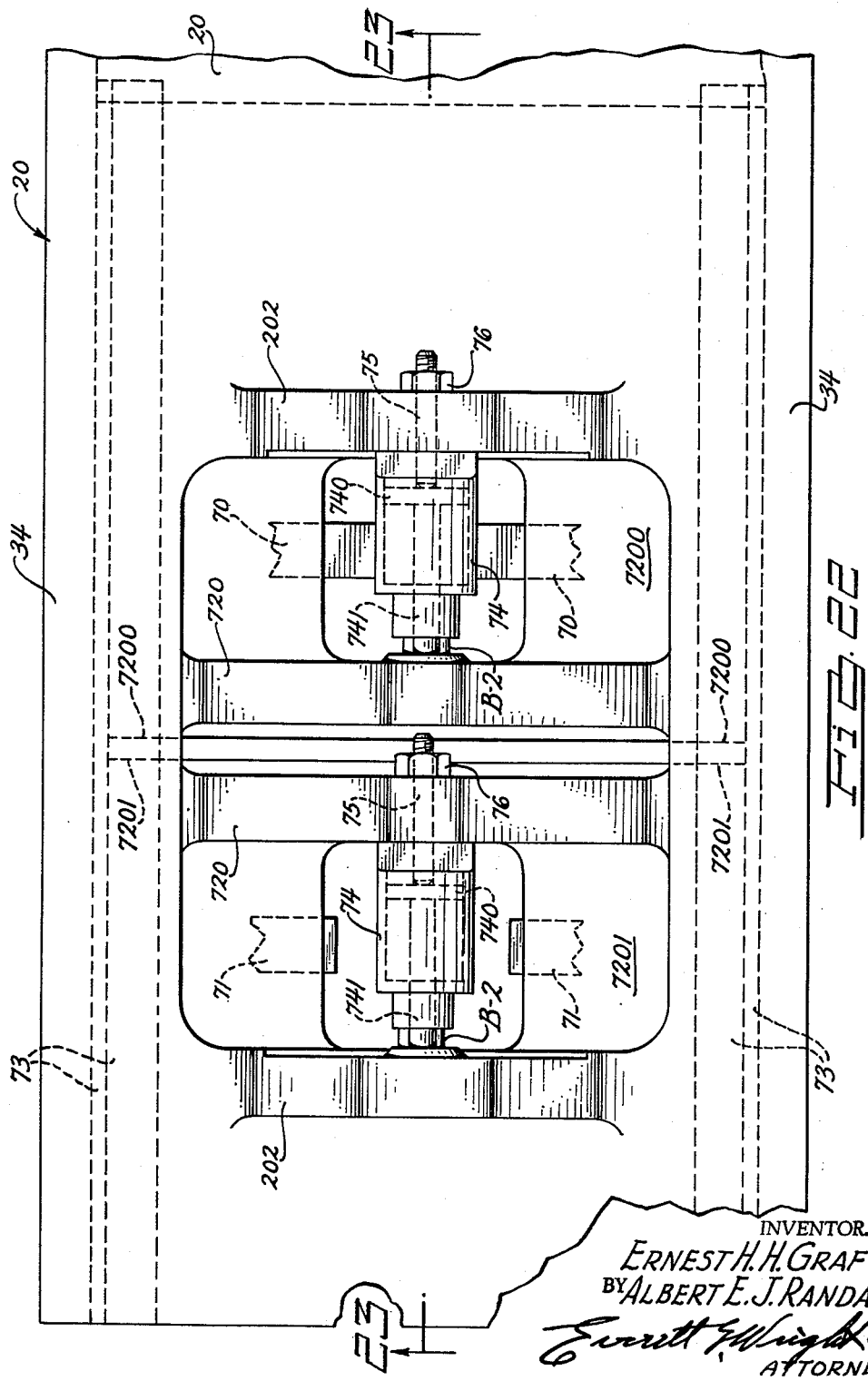

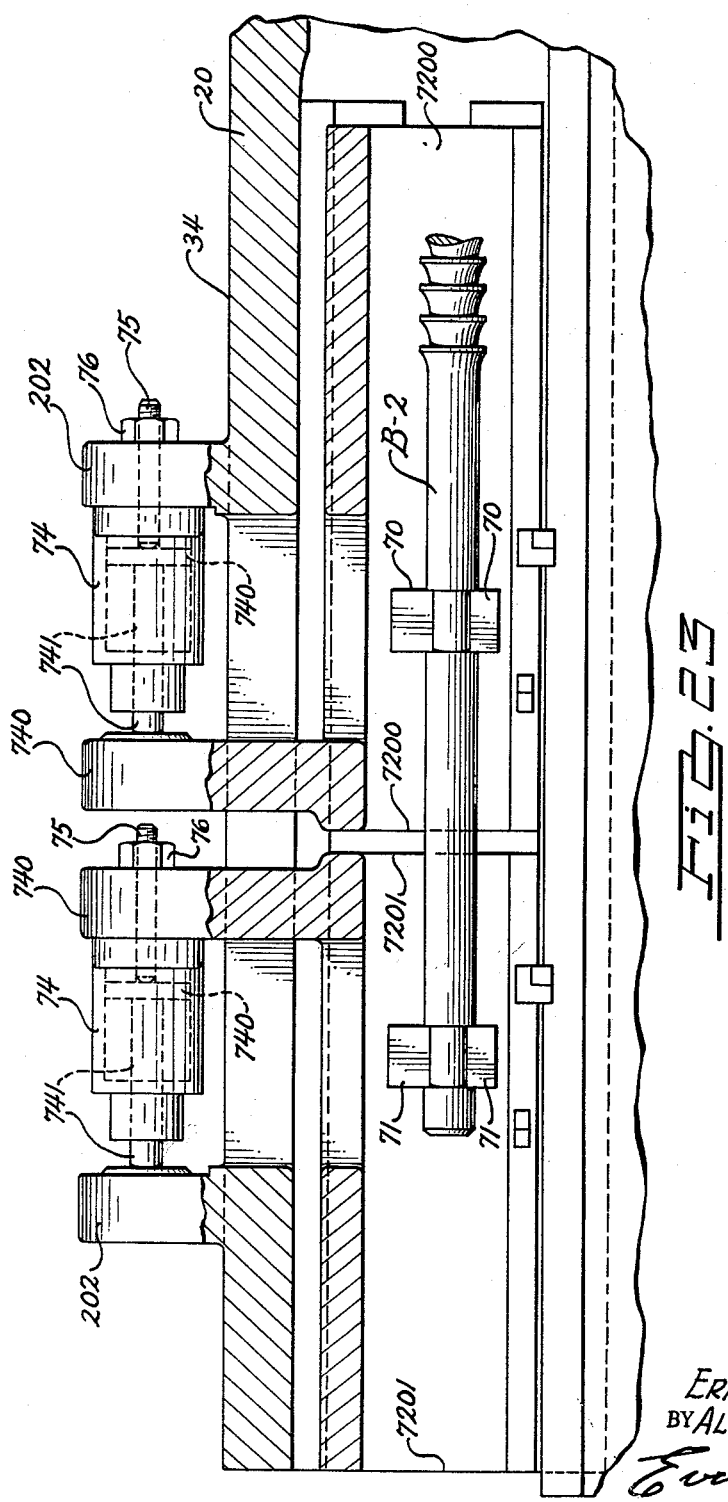

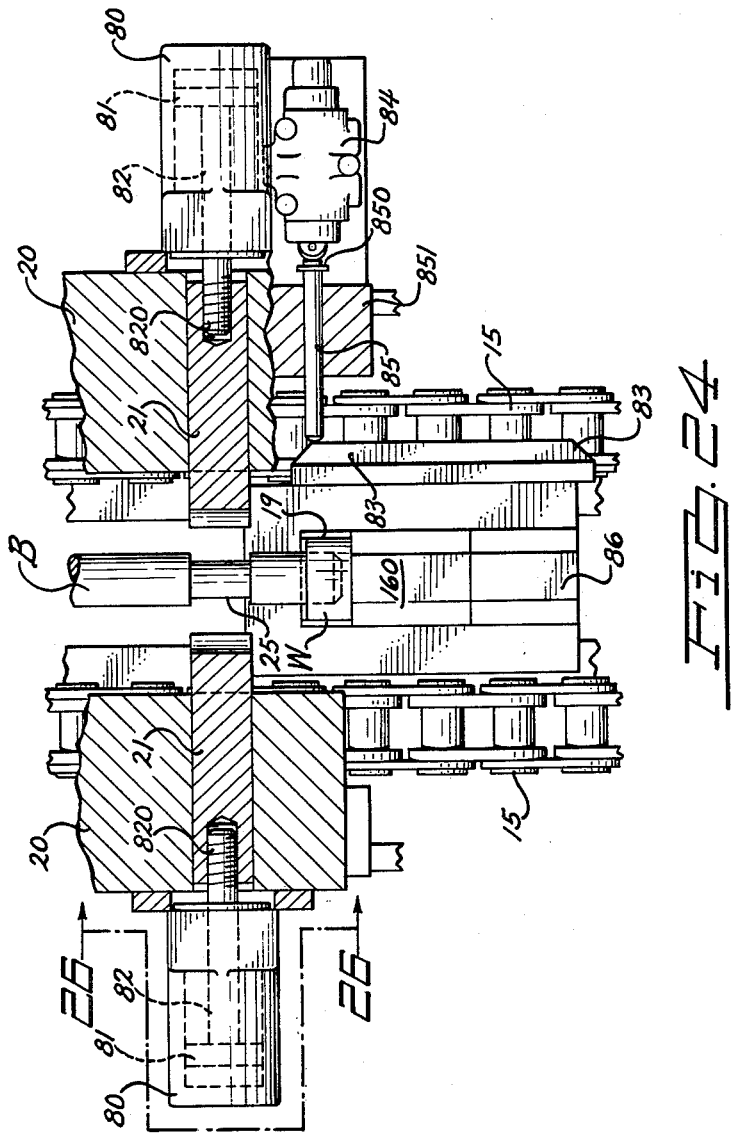

May 25, 1965     E. H. H. GRAF ETAL     3,185,039
MACHINE FOR CONTINUOUS INTERNAL BROACHING
Filed Aug. 30, 1963     14 Sheets-Sheet 14
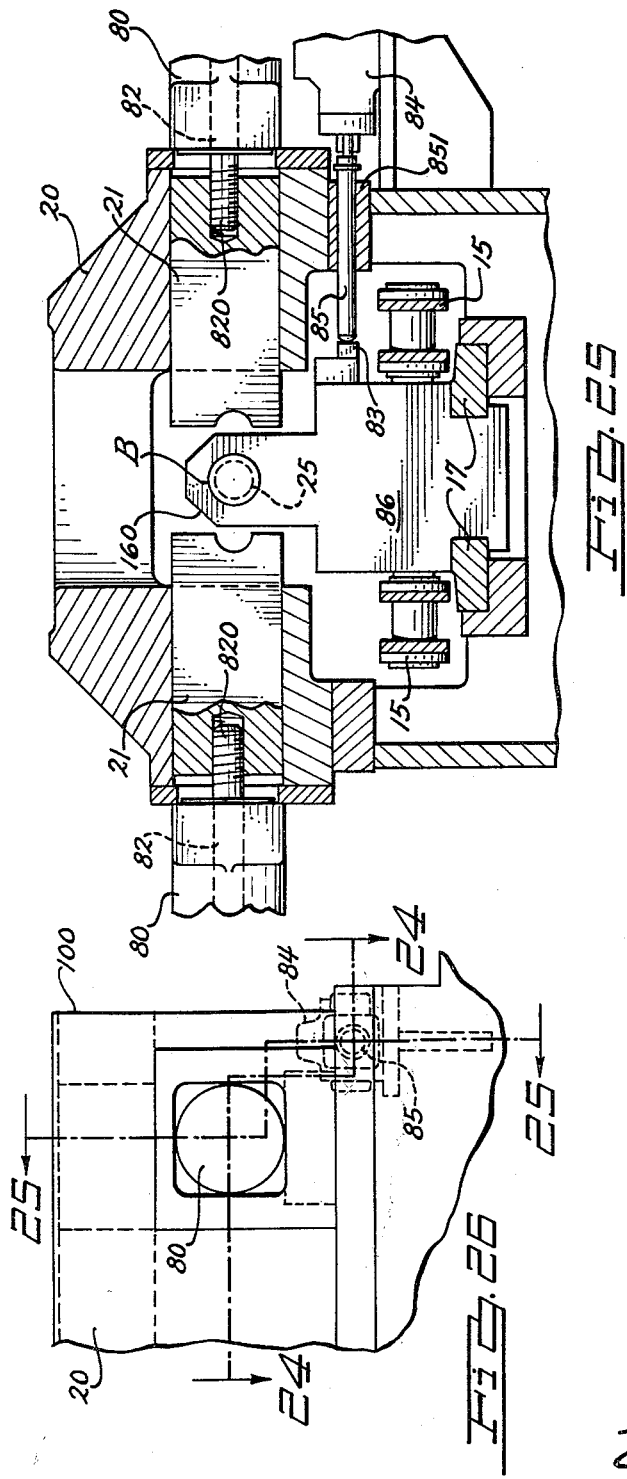
INVENTORS
ERNEST H. H. GRAF &
BY ALBERT E. J. RANDALL
ATTORNEY United States Patent Office 3,185,039
Patented May 25, 1965

3,185,039
MACHINE FOR CONTINUOUS INTERNAL
BROACHING
Ernest H. H. Graf, Birmingham, Mich., and Albert E. J. Randall, Studley, England, assignors of one-half each to Detroit Broach & Machine Company, Rochester, Mich., a corporation of Michigan, and B.S.A. Tools Limited, Birmingham, England
Filed Aug. 30, 1963, Ser. No. 305,614
12 Claims. (Cl. 90—86)

This invention relates to a method of continuous internal broaching and to continuous broaching machines of a type employable to perform internal broaching operations.

There have been in the prior art numerous continuous external broaching machines for performing external broaching operations on work pieces carried by work holders on an endless chain, the said work holders traveling along a longitudinal way under broaches fixed in a broach tunnel disposed over the way.

Such machines are employed for the external broaching of certain types of work and are highly efficient and readily accommodate themselves to combinations of hand, semi-automatic and automatic work loading and unloading.

With the foregoing in view, it is the primary object of this invention to provide an improved continuous broaching method and machine which will perform efficiently and effectively internal broaching operations.

Another object of this invention is to provide a continuous internal broaching machine including a broach and broach holding and handling mechanism at least at opposite ends of the broach to permit the telescoping of work pieces, preferably in work holders, onto and along the broach while the work holders fixed to an endless chain move along rigid guide and support ways located in spaced relationship to the broach.

A further object of the invention is to provide a continuous internal broaching machine of the aforesaid type in which the broach handling mechanism is mechanically and/or hydraulically operated in relationship to work holder travel responsive to the movement of the work holders, the work holders carrying the work in telescopic relationship onto the broach at the lead end thereof, moving it along the broach to accomplish an internal broaching operation, and removing it from the broach at the tail end thereof.

Still another object of the invention is to provide, in an internal continuous broaching machine of the type embodying the instant invention, means mounting the broach handling mechanism at at least one end of the broach for tensioning the broach between broach handling mechanisms employed at the lead and tail ends of the broach.

Other objects of the invention will become apparent by reference to the following detailed description taken in connection with the accompanying drawings, in which:

FIG. 1 is a top plan view of a continuous internal broaching machine embodying the invention.

FIG. 2 is a longitudinal sectional view taken substantially on the line 2—2 of FIG. 1.

FIG. 5 is an enlarged fragmentary horizontal sectional view taken on the line 5—5 of FIG. 2 showing the broach holder jaw actuating cams at the lead end of the broach.

FIG. 6 is a vertical sectional view taken on the line 6—6 of FIG. 5.

FIG. 7 is an enlarged vertical sectional view taken on the line 7—7 of FIG. 2 between the 1st and 2nd pairs of broach holder jaws at the lead end of the broach, the second pair of broach holder jaws being shown in their OPEN position.

FIG. 8 is an enlarged fragmentary plan view taken on the line 8—8 of FIG. 2 at the rear end of the broaching tunnel showing the 3rd pair of broach holders CLOSED with the 4th pair of boach holders OPEN.

FIG. 9 is a more or less diagrammatic view showing a broach held by the 1st and 3rd pair of broach holder jaws in their CLOSED position while the 2nd and 4th pair are retracted to their OPEN position.

FIG. 10 is a sectional view taken on the line 10—10 of FIG. 9.

FIG. 11 is a sectional view taken on the line 11—11 of FIG. 9.

FIG. 12 is an enlarged plan view at the rear end of the broaching tunnel similar to FIG. 8 showing an alternate construction of the 3rd and 4th pair of broach holder jaws employed to tension the broach.

FIG. 13 is a further enlarged fragmentary view of the 3rd pair of broach holder jaws showing a preferable form of complementary cam surfaces between the said jaws and the broach shank, the 4th pair of broach holder jaws being like and similar.

FIG. 14 is a more or less diagrammatic view showing a broach held by the 1st and 3rd pairs of broach holder jaws in their CLOSED position while the 2nd and 4th pair are retracted, the 3rd and 4th pair of broach holder jaws each having complementary cam formations between the said jaws and the broach shank employed to tension the broach.

FIG. 15 is a sectional view taken on the line 15—15 of FIG. 14.

FIG. 16 is a sectional view taken on the line 16—16 of FIG. 14.

FIG. 17 is an enlarged plan view at the rear end of the broaching tunnel showing an alternate construction employing means hydraulically tensioning the broach using broach jaw and broach formations as in the embodiment of the invention disclosed in FIGS. 1–11 inclusive, both the 3rd and 4th pairs of broach holder jaws being mounted on a single slide.

FIG. 18 is a longitudinal sectional view taken on the line 18—18 of FIG. 17.

FIG. 19 is a cross sectional view taken on the line 19—19 of FIG. 17.

FIG. 20 is a more or less diagrammatic view showing the broach of the embodiment of the invention disclosed in FIGS. 17, 18 and 19 held by the 1st and 3rd pairs of broach holder jaws while the 2nd and 4th pair are retracted.

FIG. 21 is a sectional view taken on the line 21—21 of FIG. 20.

FIG. 22 is an enlarged plan view at the rear end of the broaching tunnel showing a further alternate construction employing still another means for tensioning the broach wherein the 3rd and 4th pairs of broach holder jaws are each mounted on a separate slide.

FIG. 23 is a longitudinal sectional view taken on the line 23—23 of FIG. 22.

FIG. 24 is a horizontal sectional view through the broaching tunnel taken on the line 24—24 of FIG. 26 showing hydraulic means for closing and retracting broach holder jaws alternate to the mechanical means employed to operate the broach holder jaws disclosed in the embodiment of the invention shown in FIGS. 1-11 inclusive.

FIG. 25 is a vertical sectional view taken on the line 25—25 of FIG. 26.

FIG. 26 is a fragmentary locator side elevational view of the broaching tunnel taken on the line 26—26 of FIG. 24.

Figure 3:
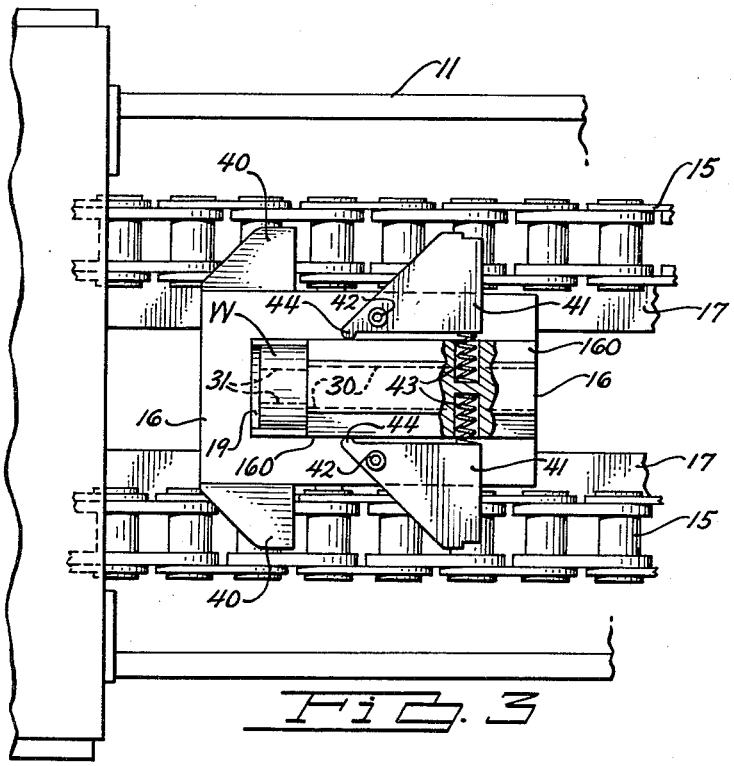
FIG. 3 is an enlarged fragmentary top plan view taken on the line 3—3 of FIG. 2 of a work holder carried by an endless chain as it approaches the broaching tunnel showing the release and hammer cams carried by the work holder.

Referring now to the drawings wherein like reference characters refer to like and corresponding parts throughout the several views, a continous internal broaching machine 10 embodying the invention disclosed in FIGS. 1–11 inclusive and comprises, in general, a machine frame 11 supporting a longitudinally disposed chain conveyor 12 consisting of pairs of end sprockets 13 mounted on transverse shafts 14 and a pair of laterally spaced roller type chains 15. The said conveyor 12 is driven by conventional conveyor drive means, not shown. The laterally spaced conveyor chains 15 carry work holders 16 fixed thereto at intervals therealong. On the machine frame 11 is a pair of longitudinal upper ways 17 which guide and support the upper flight of work holders 16 carried by the conveyor chain 15 between the sprockets 13, while the lower flight of the said work holders 16 is guided and supported on longitudinal lower ways 18.

Above the upper ways 17 is a broach tunnel 20 which houses broach handling mechanism and work holder cam mechanism. The broach handling mechanism sequentially engages and disengages a broach B as the work W is carried by work holders 16 along the upper longitudinal ways. The said broach handling mechanism includes a plurality of pairs of broach holder jaws, preferably four pairs, which open and close to permit the work W to be telescoped over, be moved along and removed from the broach B whereby to permit an internal broaching operation to be accomplished by the broach B within the said work W. At least two of the said pairs of broach holder jaws, one pair at each end of the machine, hold the broach B in broaching position at all times.

Assuming the work holders 16 fixed to the conveyor chains 15 travel from right to left during a broaching operation as indicated by the arrow A in FIG. 2, the 1st, 2nd, 3rd and 4th pairs of broach holder jaws from the right in FIG. 1 are designated 21, 22, 23 and 24. The pairs of broach holder jaws 21 and 22 and the pairs of broach holder jaws 23 and 24 open sequentially to permit the work W carried by the work holders 16 to pass onto, along and off the broach B. At the same time, at least one of the pairs of broach holder jaws 21 and 22 and at least one of the pairs of broach holder jaws 23 and 24 simultaneously hold the broach B firmly in broaching position. In the particular embodiment of the invention disclosed in FIGS. 1–11 inclusive, during continuous broaching operations one of the pairs of broach holder jaws 21 and 22 is always in engagement with one of the longitudinally spaced circular notches 25 in the lead end of the broach B to anchor the broach to accept the broaching tension, while one of the pairs of broach holder jaws 23 and 24 is always in engagement with the tail end of the broach B to hold the broach in broaching alignment.

The work holders 16 may be of any suitable shape and form to accommodate the receipt of work W placed thereinto as indicated at W in FIG. 1. In many instances, the work W need not be clamped in the work holder 16, and, in such cases, a suitable nest 19 is formed in the forward end of the upper narrow portion 160 of the work holders 16 to accommodate placement of the work W therein. In the event the work W is not clamped in the work holder 16, after having been broached internally, it may drop from the work holders 16 onto a discharge chute 26 as shown in FIG. 2. Of course, when required, the work W may be clamped in the work holder 16 by suitable manual or automatic clamping means, not shown.

Figure 4:
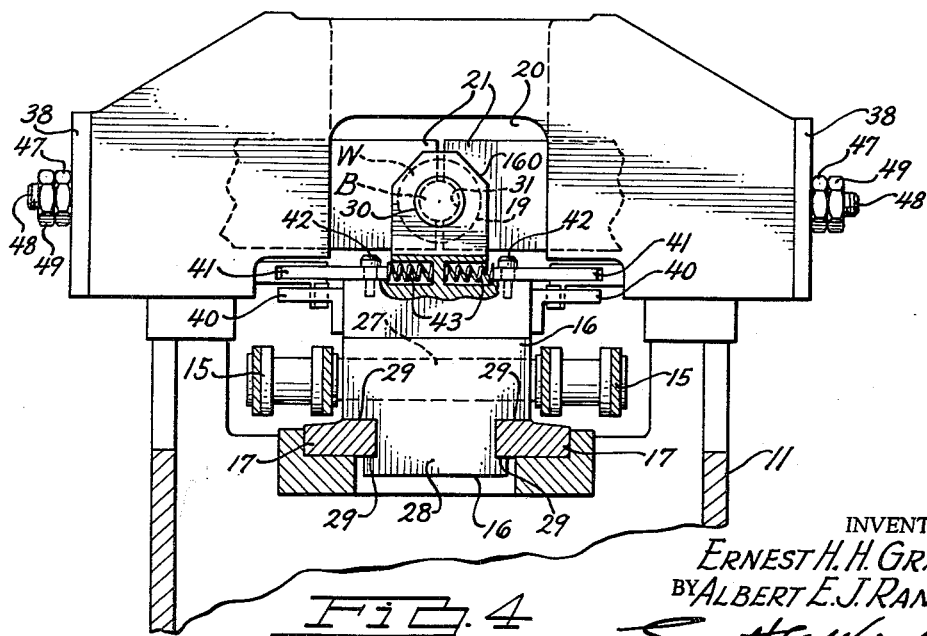
FIG. 4 is an enlarged fragmentary vertical sectional view taken on the line 4—4 of FIG. 2.

In the continuous internal broaching machine 10 disclosed in FIGS. 1–11 inclusive, each work holder 16 is preferably mounted on longitudinally adjacent link pins 27 of the conveyor chains 15 which preferably extend laterally through the base 28 of the said work holder 16 as best shown in FIG. 4. The base 28 of each work holder 16 is preferably formed T-shaped adjacent the bottom thereof to provide pairs of slides 29 which ride on pairs of longitudinally disposed laterally spaced upper and lower ways 17 and 18 as the conveyor chain 15 is in motion. This or similar construction provides a firm support for the work holders 16 as they travel through the broach tunnel 20 under the operation of the chain conveyor 12. The upper narrow portion 160 of each work holder 16 is longitudinally chamfered for tunnel clearance, and is provided with a longitudinal bore 30 therethrough of a diameter to permit the work holder 16 to telescope freely over the broach B.

The work W to be broached is indicated to be cylindrical in shape, but may be of any shape, and is positioned in a nest or cradle 19 formed in each work holder 16 at the proper elevation so that the small lead end of the broach B can telescope freely into a pre-broaching bore 31 provided in the said work W. The longitudinal center of the broach B when supported in two or more pairs of broach holder jaws 21, 22, 23 and 24 preferably is on or substantially on the longitudinal center of the work W and the longitudinal bore 30 through the work holder 16. This relationship, of course, would not obtain in instances where the work W and/or the broaching cut therein are other than substantially symmetrical with respect to each other. The proper set up of work holders and work to be broached on a continuous internal broaching machine of the invention would be obvious to anyone skilled in the art of broaching.

The sequential opening and closing of the pairs of broach holder jaws 21, 22, 23 and 24 to permit the conveyor 12 and work holders 16 mounted on the conveyor chains 15 to move the work W onto, along and off the broach B is accomplished in the embodiment of the invention disclosed in FIGS. 1–11 inclusive by a series of cams and allied elements operated by the movement of the work holders 16 along the ways 17. Each of the broach holder jaws of the pairs 21, 22, 23 and 24 thereof is preferably formed of a rectangular bar reciprocatingly fit into a transversely disposed rectangular broach holder jaw guide 32 formed through a side wall 33 of the broach tunnel 20. The said broach tunnel 20 is supported on the machine frame 11 and consists of two side walls 33 and a top 34 apertured at 35 to provide inspection access to each pair of broach holder jaws 21, 22, 23 and 24. The jaw guides 32 for each pair of broach holders are disposed transversely of the upper ways 17 and at such a distance thereabove as to permit the broach holder jaws 21, 22, 23 and 24 slidable therein to support and hold the broach B in the desired position when moved into engagement therewith. At the bottom of each side wall 33 of the broach tunnel 20 is a cam housing 36 formed to carry broach holder jaw operating cam means for each pair of broach holder jaws 21, 22, 23 and 24, the said broach holder jaw operating cam means being actuated by cam means carried by each work holder 16, all as hereinafter described in detail.

By reference to FIGS. 3 and 4 which show top and rear end views of a work holder 16, a pair of laterally extending fixed release cams 40 extend laterally outwardly from the front portion of the said work holder 16, and a pair of generally triangular relatively flat locking hammer cams 41 located somewhat rearwardly of and at an elevation above the release cams 40 are pivoted near their forward end to the work holder 16 by means of vertically disposed hammer cam pivots 42 and extend laterally outwardly from the said work holder 16. Compression springs 43 in suitable lateral bores provided in the work holder 16 constantly urge the locking hammer cams 41 to swing outwardly about the hammer cam pivots 42 to their extended position as shown in FIG. 3. The said extended position of the locking hammer cams 41 is established by a nub 44 formed on the forward end of each locking hammer cam 41 which contacts the wall 37 at the upper relatively narrow portion 160 of the work holder 16. Each locking hammer cam 41 is provided with an angularly disposed cam surface 45, and is notched at its extreme outer end to provide a hammer head 46, the function of which will be later described.

FIGS. 5–7 inclusive disclose broach holder jaw operating cam means for each pair of broach holder jaws 21 and 22 at the lead end of the broach B, which jaws are actuated by the release cams 40 and the locking hammer cams 41 carried by the broach holders 16. The broach holder jaws 21 are shown in their closed position in FIGS. 5 and 6 engaging the broach B at the endmost circular notch 25 thereof while the broach holder jaws 22 are shown in their open position sufficiently free of the broach B to permit the upper work holding portion 160 of a work holder 16 to pass therebetween, the said work holder 16 being indicated in FIG. 5 longitudinally between the pair of broach holder jaws 21 and the pair of broach holder jaws 22 shown therein.

Each broach holder jaw operating cam means consists of a set of sliding cams 50 disposed in suitable chases and cam surfaces formed in a cam housing 36, one cam housing and one cam set being provided for each broach holder jaw of each pair of broach holder jaws 21 and 22 as best shown in FIGS. 5 and 6. Detailed description of the opening and closing of pairs of broach holder jaws by broach holder jaw operating cam means actuated by the fixed release cams 40 and the locking hammer cams 41 carried by the work holders 16 will be combined for clarity with the description of the operation thereof.

When the operator starts a continuous internal broaching machine of the invention disclosed in FIGS. 1–11 inclusive, it may be assumed that the pairs of broach holder jaws 21 and 22 are closed and support and anchor the lead end of the broach B, and that the pairs of broach holder jaws 23 and 24 are also closed and support the tail end of the said broach B. As the upper flight of the chain 15 travels in a right to left or forward direction indicated by the arrow A in FIG. 2, the pair of broach holder jaws 21 are opened and closed by a work holder 16. The pair of broach holder jaws 22 are shown as opened by the same work holder 16 that had just closed the broach holder jaws 21. This is the attitude of the pairs of broach holder jaws 21 and 22 as shown in FIG. 5. The machine operator has placed work W in the nest or cradle 19 of the work holders 16 with an end face of the work W in abutment with the rear end wall of the cradle 19, and, in FIG. 5 a work holder 16 has telescoped the work W onto the lead end of the broach B and has moved the said work W to the shown position between the pair of broach holder jaws 21 and the pair of broach holder jaws 22, the said work holder 16 having opened the broach holder jaws 22.

Each set of broach holder jaw operating cams 50 include a transverse jaw opening cam 51, a longitudinal cam 52, a broach holder jaw cam cut 53 on a broach holder jaw 21, 22, 23 or 24 forming cam surfaces 530 and 531 in the lower portion thereof, and a transverse jaw closing cam 54, all of said cams having complementary diagonal cam surfaces to provide rectilinear movement of a broach holder jaw 21, 22, 23 or 24 with respect to the travel of the work holder 16 carrying the release cams 40 and locking hammer cams 41.

With the broach holder jaws 21 closed and in engagement with the broach B as shown in FIG. 5, and assuming a work holder 16 is being moved along the upper ways 17, the release cam surface 400 of each of the fixed release cams 40 carried by the work holder 16 first contact the cam surface 510 of each of the transverse jaw opening cams 51 thereby moving the said jaws opening cams 51 laterally outwardly. This causes the cam surface 511 on each of the jaws opening cams 51 to travel along the cam surface 520 of each of the longitudinal cams 52 moving the said longitudinal cams 52 to the left as viewed in FIG. 5. The cam surface 521 of each of the longitudinal cams 52 come into sliding contact with the cam surface 530 formed on each of the broach holder jaws 21 at a cam cut 53 in the bottom thereof whereupon the broach holder jaws 21 move from their closed or advanced position shown in FIG. 5 to their open or retracted position similar to the open or retracted positon of the broach holder jaws 22 also shown in FIG. 5; the broach holder jaws 22 each having a like cam cut 53 and cam surface 530 therein.

After the broach holder jaws have been opened and moved to their retracted position as illustrated at the broach holder jaws 22 in FIG. 5, the upper work holding portion of the work holder 16 passes clear of the said broach holder jaws 22 and the cam surface 45 of each locking hammer cam 41 contacts the cam surface 540 of a transverse jaw closing cam 54 and moves the said jaw closing cams 54 laterally outwardly. Each jaw closing cam 54 also has a cam surface 541 which travels along the cam surface 522 on the longitudinal cams 52 moving the said longitudinal cams 52 to the right as viewed in FIG. 5. The cam surface 523 on each of the longitudinal cams 52 come into sliding contact with the cam surface 531 formed on each of the broach holder jaws 22 at the said cam cut 53 therein which moves the said broach holder jaws 22 from their open or retracted position shown in FIG. 5 to their closed or advanced position similar to that of the closed or advanced position of the broach holder jaws 21 also shown in FIG. 5; the broach holder jaws 21 each having a like cam surface 531 at the cam cut 53 therein.

The closing movement of each of the broach holder jaws 21 and 22 is stopped by a stop nut 47 threaded on a stop rod 48 extending laterally outwardly from the outer end of each broach holder jaw through a side plate cover 38 on the side wall 33 of the broaching tunnel 20 opposite each set of broach holder cams 50. A lock nut 49 is employed to maintain the stop nut 47 in its proper adjusted position. Thus, the stop nuts 47 prevent further movement of the broach holder jaws 22 at this time, the broach holder jaws 22 having moved to their advanced or closed position.

As the work holder 16 continues to move forward in its direction of travel after the broach holder jaws 22 are in their closed position, each locking hammer cam 41 is forced by the cam surface 540 of the jaw closing cam 54 in contact with the cam surface 45 of the said locking hammer cam 41 to pivot around its pivot 42 and compress the locking hammer cam spring 43 thereof. As the work holder 16 travels further, the outer flat edge 410 of the locking hammer cam 41 travels along the inner end face 542 of the jaw closing cam 54 until it passes clear thereof whereupon the locking hammer cam 41 swings abruptly outwardly under the power of the retracted hammer cam spring 43 and the anvil surface 460 of the hammer head 46 of the locking hammer cam 41 strikes a sharp blow on the inner end face 542 of the jaw closing cam 54. Thusly, the broach holder jaws 22 are securely locked in their closed position like the closed position of the broach holder jaws 21 shown in FIG. 5.

Each of the pairs of broach holder jaws 21, 22, 23 and 24 are operated mechanically by cams carried by the work holders hereinabove described for the opening of the broach holder jaws 21 and for the closing of the broach holder jaws 22. In the embodiment of the invention disclosed in FIGS. 1–11 inclusive, the pairs of broach holder jaws 23 and 24 are dimensioned so that they will engage the tail portion of the broach B. Inasmuch as the longitudinal thrust of the broach B is always taken by either one or both of the pairs of broach holder jaws 21 and 22, the tail portion of the broach B need not be provided with a circular notch 25 to provide an annular shoulder 250 for broach engagement longitudinally with the broach holder jaws when closed.

In FIGS. 9, 10 and 11, the broach holder jaws 21 and 23 are indicated in their closed position supporting the broach B. The broach holder jaws 22 and 24 are indicated in their open position. After a work holder 16 passes through the open broach holder jaws 22 at the lead end of the broach B and closes the same, a following work holder 16 opens the broach holder jaws 21 permitting work W to pass therethrough. Also, when a work holder 16 closes the open broach holder jaws 24 at the tail end of the broach B, the following work holder 16 will open the closed broach holder jaws 23 and permit work W to pass therethrough. The number of work holders 16 between the pairs of broach holder jaws 22 and 23 at any one time depends upon the spacing of the work holders 16 on the chain conveyor 12 and the longitudinal space between the said pairs of broach holder jaws 22 and 23. The space between the pairs of broach holder jaws 21 and 22 and between the pairs of broach holder jaws 23 and 24 is preferably in each instance sufficient to permit the closing of the one pair of broach holder jaws while the other pair is opened. Thusly, the broach B is always held by one of the pairs of broach holder jaws 21 and 22 and one of the pairs of broach holder jaws 23 and 24 as the work W is threaded on the leading end of the broach B and moved therealong the said broach B to cause a broaching operation to be performed thereon. At all times, the longitudinal tension of the broach B is taken by one pair of the broach holder jaws 21 or 22 at the lead end of the broach B while the tail end of the broach B is always and held in its proper position by one pair of the broach holder jaws 23 or 24. The annular radially disposed shoulder 250 at each circular notch 25 in the broach B bears against the adjacent side of a pair of closed broach holder jaws 21 or 22 when closed to anchor the broach B against broach tension during the broaching operation of the embodiment of the continuous internal broaching machine disclosed in FIGS. 1–11 inclusive.

Reference is now made to the embodiment of the invention disclosed in FIGS. 12–16 inclusive, which is like and similar to the embodiment of the invention disclosed in FIGS. 1–11 inclusive except that the 3rd and 4th pair of broach holder jaws designated by the reference numerals 60 and 61 respectively are each formed with a segmental frusto-conical cam surface 62 at the semi-circular notch 65 in the end thereof, which cam surfaces 62 engage complementary frusto-conical annular cam surfaces 63 formed on the broach B–1 at the tailmost end of circular notches 65 formed therein when the pairs of broach holder jaws 60 and 61 are closed.

When the broach holder jaws 60 or 61 or both of the broach holder jaws 60 and 61 are closed, the closing force of the said broach holder jaws 60 and/or 61 acting through the cams 62 and 63 urge the tail end of the broach B–1 to the left as viewed in FIG. 14 placing tension thereon, at which time the lead end of the broach B–1 is anchored at either or both of the 1st and 2nd pairs of broach holder jaws 21 and 22 with the annular radially disposed shoulder 250 at at least one of the circular notches 25 in the broach B–1 bearing against the right hand face of at least one of the pairs of broach holder jaws 21 and 22. Thusly, as the pairs of broach holder jaw 21, 22, 60 and 61 open and close sequentially responsive to the right to left movement of the work holders 16 through the broach tunnel 20, the broach B–1 is maintained under tension at all times. Alternately, the broach holder jaws 60 and 61 may be substituted for broach holder jaws 21 and 22, and the broach formations 63 and 64 may be used at the lead end of the broach B–1 of FIG. 14, all opposite hand to like construction employed at the tail end of said broach, thus also providing means for tensioning the broach.

The embodiment of the invention disclosed in FIGS. 17–21 inclusive is like and similar to the embodiment of the invention disclosed in FIGS. 1–11 inclusive, except that the 3rd and 4th pair of broach holder jaws designated by the reference numerals 70 and 71 and their operating mechanism is the same as for the pairs of broach holder jaws 21 and 22 of the embodiment of the invention disclosed in FIGS. 1–11 inclusive, and except that the entire broach holder jaws 70 and 71 and their operating mechanism is mounted on a generally rectangular slide 72 which is hydraulically urged rearwardly or to the left as viewed in FIGS. 17, 19 and 20 in respect to the 1st and 2nd pair of boach holder jaws 21 and 22, the latter being mounted through the walls of the broach tunnel 20 against longitudinal movement in respect thereto.

The slide 72 is indicated diagrammatically in FIG. 20 with the arrow A–72 indicating the unitary movement of the slide 72 and broach holder jaws and jaw operating mechanism thereon in respect to the broach holder jaws 20 and 21 to tension the broach B–2. The broach B–2 differs from the broach B in that the broach B–2 is provided with circular notches 25 at both the lead end and at the tail end thereof to accommodate the broach holder jaws 21, 22, 70 and 71 sequentially closed by the jaw operating mechanism hereinbefore described for the operation of the broach holder jaws 21, 22, 23 and 24 of the embodiment of the invention disclosed in FIGS. 1–11 inclusive.

In FIGS. 17, 18 and 19, the broach tunnel 20 is enlarged to accommodate therewithin longitudinal interior corner ways 73 within and on which the slide 72 is slidably mounted. The broach holder jaw operating mechanism for the broach holder jaws 70 and 71 carried by the slide 72 is the same as disclosed for the embodiment of the invention disclosed in FIGS. 1–11 inclusive, and has not been shown in FIGS. 17, 18 and 19 to avoid undue repetition. As in the embodiment of the invention disclosed in FIGS. 1–11 inclusive, the jaw operating mechanism opens and closes the broach holder jaws 70 and 71 responsive to the movement of the work holders 16 and the cams carried thereby.

The tunnel 20 is open at its top at 200 and is provided with an upturned bracket 202 onto which a hydraulic cylinder 74 having a piston 740 is mounted. The piston rod 741 extending from the piston 740 of the hydraulic cylinder 74 is connected to a bracket 720 extending upwardly from the slide 72. By applying hydraulic fluid under pressure by conventional means, not shown, to the hydraulic cylinder 74 on either one side or the other of the piston 740 thereof, the said slide 72 may be moved longitudinally of the ways 73 in either direction. Such means as a suitable threaded stop pin 75 and lock nut 76 may be employed to stop movement of the piston 740 of the hydraulic cylinder 74 whereby to locate accurately the position of the slide 72 and the pairs of broach holder jaws 70 and 71 mounted thereon in respect to the broach notches 25 before tensioning the broach B–2. To observe the operation of the pairs of broach holder jaws 70 and 71 the top of the slide 72 is suitably apertured vertically at 721. The slide 72 is provided with a longitudinal tunnel 722 to accommodate the travel therethrough of the work holders 16.

The operation of the embodiment of the invention disclosed in FIGS. 17–21 inclusive is the same as that of the operation of the invention disclosed in FIGS. 1–11 inclusive, except that, when one of the pairs of broach holder jaws 21 and 22 and one of the pairs of broach holder jaws 70 and 71 are closed, as they always are during the operation of an internal continuous broaching machine of the invention, and hydraulic fluid under pressure is applied to the right hand end of the hydraulic cylinder 74 as viewed in FIGS. 17 and 18, the slide 72 carrying the broach holder jaws 70 and 71 is moved and/or urged to the left as viewed in FIGS. 17 and 18 and shown diagrammatically in FIG. 20, thus applying tension on the broach B–2 between one of the pairs of broach holder jaws 21 and 22 and one of the pairs of broach holder jaws 70 and 71. This tensioning prevents broach sag between its lead end and tail end supports of the broach when the unsupported length of the broach is extremely great in proportion to its diameter.

By reference to FIGS. 22 and 23, the pair of broach holder jaws 70 and their operating mechanism is mounted on one generally rectangular slide 7200 and the pair of broach holder jaws 71 and their operating mechanism is mounted on a second rectangular slide 7201, rather than both pairs of broach holder jaws 70 and 71 being mounted on a single slide 72 as shown in FIGS. 17–21 inclusive. The use of two slides 7200 and 7201 each carrying one of the pairs of broach holder jaws 70 and 71 respectively is desirable when tensioning a broach B-2 of a relatively large size and maintaining it under tension as the pairs of broach holder jaws 70 and 71 are alternately retracted and closed as hereinbefore described.

Each of the slides 7200 and 7201 are like and similar to the slide 72 shown in the embodiment of the invention disclosed in FIGS. 17–21 inclusive, and the description thereof need not be repeated. The enlarged broach tunnel 20 and the ways 73 are also similar to the construction thereof disclosed and described in connection with like elements shown in FIGS. 17–21 inclusive except that the enlarged broach tunnel 20 is longer and is provided with two upturned brackets 202 onto each of which a hydraulic cylinder 74 is mounted, each hydraulic cylinder being connected by its piston rod 740 to a bracket 720 extending upwardly from one of the slides 7200 and 7201.

In FIGS. 24, 25 and 26 is disclosed alternate construction wherein hydraulic means are provided rather than mechanical means for retracting and closing the pairs of broach holder jaws hereinbefore described for sequentially holding the broach in position as a work holder carries the work thereby. The hydraulic means will be described as that for retracting and closing the 1st pair of broach holder jaws designated by the reference numeral 21. It is obvious that the same hydraulic means may be employed for retracting and closing the 2nd, 3rd and 4th pairs of broach holder jaws in the several embodiments of the invention disclosed herein.

FIG. 26 is a fragmentary side elevational view of the broach tunnel 20 at the lead end of a continuous internal broaching machine 100 similar to the broaching machine 10 disclosed in FIGS. 1–11 inclusive except that the pairs of broach holder jaws 21 are hydraulically operated, the said FIG. 26 serving as a locator view indicating where FIGS. 24 and 25 have been taken.

Referring now particularly to FIGS. 24 and 25, a hydraulic cylinder 80 is mounted on the outer side of the broach tunnel 20 opposite the laterally outer end of each broach holder jaw 21. Each hydraulic cylinder 80 has a piston 81 and a piston rod 82, the latter being suitably anchored by such means as a threaded connection 820 to a broach holder jaw 21. Movement of the pistons 81 closes and retracts the pair of broach holder jaws 21 into and out of engagement with the broach B at the circular notch 25 therein.

As hereinbefore described in connection with the embodiment of the invention disclosed in FIGS. 1–11 inclusive, work W carried by cradle 19 in the upper portion 160 of work holders 16 is telescoped over and broached by the broach B as the continuous conveyor chains 15 move work holders 16 along the longitudinal upper ways 17. The work holders 86, one of which is shown in FIGS. 24 and 25, are like and similar to the broach holders 16 except they carry only one cam bar 83 fixed to one side thereof which shifts a hydraulic valve 84 which, through a conventional type of hydraulic circuit, not shown, applies hydraulic fluid under pressure to the hydraulic cylinders 80 to close the pair of broach holder jaws 21 when the cam bar 83 operates the hydraulic valve 84 through a suitable push rod 85. After the cam bar 83 passes the push rod 85 it moves outwardly to the limit of its movement governed by a shoulder 850 thereon which comes to rest against a push rod mounting block 851 secured to the broaching machine frame 11. The said push rod 85 may be either spring loaded or hydraulically urged to its outwardly extended position ready for contact by a cam bar 83 fixed on successive passing work holders 86 carried by the continuous chains 15. The length of the cam bar 83 carried by each work holder 86 determines the timing of the retracting and closing of the broach holder jaws 21 as each successive work holder 86 approaches and passes therethrough.

In the embodiment of the invention disclosed in FIGS. 12–16 inclusive, the pairs of broach holder jaws 21, 22, 60 and 61 employ the same construction as just described if hydraulically powered rather than mechanically operated.

However, in the embodiment of the invention disclosed in FIGS. 17–21 inclusive and the alternate construction disclosed in FIGS. 22 and 23 wherein pairs of broach holder jaws 21, 22, 70 and 71 are employed, and the pairs of broach holder jaws 70 and 71 are mounted on a single common slide 72, or, the broach holder jaws 70 may be mounted on one slide 7200 and the broach holder jaws 71 may be mounted on a second slide 7201, it is obvious that like and similar means as just described may be used for hydraulically powering the pairs of broach holder jaws 70 and 71, except that the hydraulic cylinders 80 and hydraulic valves 84 for powering the pairs of broach holder jaws 70 and 71 must be mounted on the single common slide 72, or, if employed on the two separate slides 7200 and 7201 respectively.

In connection with the method of continuous internal broaching incorporating the invention, the work W having a broaching aperture therethrough is carried by work holders traveling in a given path for being telescoped over a broach supported at spaced locations at both the lead end and at the tail end of the broach, each support being retracted and advanced in timed relationship with respect to the movement of the work and work holders to admit of the work passing along said broach without interference from the broach supports, at least one of the broach supports at each end of the broach is supporting the said broach at all times, and, the said one of the broach supports at the lead end of the broach anchoring said broach against longitudinal movement in the direction of the travel of the work W simultaneously with supporting the said lead end of the broach. The method includes that the broach may be tensioned while the foregoing is accomplished.

Although but several embodiments of the method and machine of the invention have been disclosed herein in detail together with modifications thereof, it is obvious that many changes may be made in the method steps employed and in the size, shape, arrangement and details of the various elements of the invention, all without departing from the spirit and scope thereof as defined by the appended claims.

We claim:
1. A continuous internal broaching machine comprising a frame including a pair of longitudinal ways thereon and an endless chain conveyor operatively mounted on said frame having its upper flight running parallel to said ways,
a broach extending longitudinally of said ways and disposed in parallel spaced relationship thereto,
a plurality of work holders adapted to carry work to be broached internally mounted in longitudinal spaced relationship on said chain conveyor formed to travel on and along said ways,
said work having an aperture therein disposed in alignment with said broach and of sufficient size to admit of said work being telescoped over the lead end of said broach,
at least two pair of broach holder jaws at each of the lead end and the tail end of said broach supporting said broach on said machine frame parallel to said ways, and means sequentially opening and closing each said pair of broach holder jaws permitting said work holders and work to pass therethrough with at least one of the pairs of broach holder jaws adjacent each end of said broach engaging said broach at all times, the broach holder jaws at the lead end of said broach engaging said broach and holding the same against longitudinal movement in addition to supporting said broach responsive to the closing of either of said pairs of broach holder jaws at the lead end of the broach.

2. A continuous internal broaching machine comprising a frame including a pair of longitudinal ways thereon and an endless chain conveyor operatively mounted on said frame having its upper flight running parallel to said ways, a broach extending longitudinally of said ways and disposed in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach, at least two pair of broach holder jaws at each of the lead end and the tail end of said broach supporting said broach on said machine frame parallel to said ways, means sequentially opening and closing each said pair of broach holder jaws permitting said work holders and work to pass therethrough with at least one of the pairs of broach holder jaws adjacent each end of said broach engaging said broach at all times, and formations on said broach for engagement by said pairs of broach holder jaws at the lead end of said broach holding said broach against longitudinal movement in addition to supporting it responsive to the closing of either of said pairs of broach holder jaws at the lead end of the broach.

3. A continuous internal broaching machine comprising a frame including a pair of longitudinal ways thereon and an endless chain conveyor operatively mounted on said frame having its upper flight running parallel to said ways, a broach extending longitudinally of said ways and disposed in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach, broach supporting means including at least two pair of broach holder jaws at each of the lead end and the tail end of said broach supporting said broach on said machine frame parallel to said ways, means sequentially opening and closing each said pair of broach holder jaws permitting said work holders and work to pass therethrough with at least one of the pairs of broach holder jaws adjacent each end of said broach engaging said broach at all times, formations on said broach for interengagement between said broach holder jaws and said broach at the lead end of said broach holding said broach against longitudinal movement in addition to supporting it responsive to the closing of either of said pairs of broach holder jaws at the lead end of the broach, and means incorporated in the broach supporting means at the tail end of said broach applying tension on said broach.

4. A continuous internal broaching machine comprising a frame including a pair of longitudinal ways thereon and an endless chain conveyor operatively mounted on said frame having its upper flight running parallel to said ways, a broach extending longitudinally of said ways and disposed in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach, at least two pair of broach holder jaws at each of the lead and the tail end of said broach supporting said broach on said machine frame parallel to said ways, means sequentially opening and closing each said pair of broach holder jaws permitting said work holders and work to pass therethrough with at least one of the pairs of broach holder jaws adjacent each end of said broach engaging said broach at all times, and formations on said broach for engagement by said pairs of broach holder jaws at the lead end of said broach holding said broach against longitudinal movement in addition to supporting it responsive to the closing of either of said pairs of broach holder jaws at the lead end of the broach, the said tail end of said broach and said two pairs of broach holder jaws at the tail end of said broach having complementary beveled surfaces cooperating to apply tension on said broach when either or both pairs of broach holder jaws at the tail end of said broach are in engagement with said broach.

5. A continuous internal broaching machine comprising a frame including a pair of longitudinal ways thereon and an endless chain conveyor operatively mounted on said frame having its upper flight running parallel to said ways, a broach extending longitudinally of said ways and disposed in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach, at least two pair of broach holder jaws at each of the lead end and the tail end of said broach supporting said broach on said machine frame parallel to said ways, means sequentially opening and closing each said pair of broach holder jaws permitting said work holders and work to pass therethrough with at least one of the pairs of broach holder jaws adjacent each end of said broach engaging said broach at all times, formations on said broach for engagement by said pairs of broach holder jaws at the lead end of said broach holding said broach against longitudinal movement in addition to supporting it responsive to the closing of either of said pairs of broach holder jaws at the lead end of the broach, formations on said broach for engagement by said pairs of broach holder jaws at the tail end of said broach to admit of the application of tension on said broach in addition to supporting it responsive to the closing either of the said pairs of broach holder jaws at the tail end of the broach, a slide on said frame supporting the two pairs of broach holder jaws at the tail end of said broach, and means urging said slide in the direction of the travel of the work being broached whereby to tension said broach.

6. A continuous internal broaching machine comprising a frame including a pair of longitudinal ways thereon and an endless chain conveyor operatively mounted on said frame having its upper flight running parallel to said ways, a broach extending longitudinally of said ways and disposed in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach, at least two pair of broach holder jaws at each of the lead end and the tail end of said broach supporting said broach on said machine frame parallel to said ways, means sequentially opening and closing each said pair of broach holder jaws permitting said work holders and work to pass therethrough with at least one of the pairs of broach holder jaws adjacent each end of said broach engaging said broach at all times, formations on said broach for engagement by said pairs of broach holder jaws at the lead end of said broach holding said broach against longitudinal movement in addition to supporting it responsive to the closing of either of said pairs of broach holder jaws at the lead end of the broach, formations on said broach for engagement by said pairs of broach holder jaws at the tail end of said broach to admit of the application of tension on said broach in addition to supporting it responsive to the closing either of the said pairs of broach holder jaws at the tail end of the broach, a pair of slides on said frame, each slide supporting one pair of the two pairs of broach holder jaws at the tail end of said broach, and means urging each said slide independently of the other in the direction of the travel of the work being broached whereby to tension said broach.

7. A continuous internal broaching machine comprising a frame including a pair of longitudinal ways thereon and an endless chain conveyor operatively mounted on said frame having its upper flight running parallel to said ways, a broach extending longitudinally of said ways and disposed in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach and moved by said work holders therealong to accomplish an internal broaching operation, at least two pairs of broach holder jaws at each of the lead end and the tail end of said broach supporting said broach on said machine frame parallel to said ways, and means sequentially opening and closing each said pair of broach holder jaws permitting said work holders and work to pass therethrough with at least one of the pairs of broach holder jaws adjacent each end of said broach engaging and supporting said broach at all times, the lead end of said broach being notched to receive complementary formed ends of the two pairs of broach holder jaws at said lead end of said broach providing shoulders for broach engagement with said broach holder jaws thereby holding said broach against longitudinal movement thereof in the direction of the travel of said work holders along said ways.

8. A continuous internal broaching machine as claimed in claim 7 wherein the means opening and closing each said pair of broach holder jaws comprises a set of sliding jaw opening and closing cam means for each broach holder jaw located on said frame above and on opposite sides of said ways, and actuating cam means carried by each said work holder contacting said jaw opening and closing cam means responsive to travel of said work holders on and along said ways located on said work holders to open each said pair of broach holder jaws as the said work holders approach the same and to close each said pair of broach holder jaws as the said work holders pass the same.

9. A continuous internal broaching machine as claimed in claim 7 wherein the means opening and closing each said pair of broach holder jaws comprises a set of sliding jaw opening and closing cam means for each broach holder jaw located on said frame above and on opposite sides of said ways, actuating cam means carried by each said work holder contacting said jaw opening and closing cam means responsive to travel of said work holders on and along said ways located on said work holders to open each said pair of broach holder jaws as the said work holders approach the same and to close each said pair of broach holder jaws as the said work holders pass the same, and spring loaded hammer cam means carried by each said work holder cocked by said jaw closing cam means responsive to said travel of said work holders on and along said ways, said hammer cam means striking said jaw closing cam means as it is moved to its jaw closed position.

10. A continuous internal broaching machine as claimed in claim 7 wherein the means opening and closing each said pair of broach holder jaws comprises a double acting cylinder fixed in respect to said frame operatively connected to each broach holder jaw of each pair thereof, a source of fluid under pressure connected to each said cylinder, mechanically operable valve means applying said fluid under pressure to open and close each said pair of broach holder jaws, and a cam mounted on each work holder operating said valve means to open and close each said pair of broach holder jaws as the work holder and work carried thereby passes the same.

11. A continuous internal broaching machine comprising a frame including a pair of longitudinal ways thereon and an endless chain conveyor operatively mounted on said frame having its upper flight running parallel to said ways, a broach extending longitudinally of said ways and disposed in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach and moved by said work holders therealong to accomplish an internal broaching operation, at least two pairs of broach holder jaws at each of the lead end and the tail end of said broach supporting said broach on said machine frame parallel to said ways, means sequentially opening and closing each said pair of broach holder jaws permitting said work holders and work to pass therethrough with at least one of the pairs of broach holder jaws adjacent each end of said broach engaging said broach at all times, and complementary bevel cam formations on said broach and on each said pairs of broach holder jaws engaged by said pairs of broach holder jaws at the lead end and tail end of said broach holding said broach against longitudinal movement simultaneously tensioning the same responsive to the closing of pairs of broach holder jaws at the lead end and the tail end of the broach.

12. A continuous internal broaching machine comprising
a frame including a pair of longitudinal ways thereon and an endless chain conveyor operatively mounted on said frame having its upper flight running parallel to said ways, a broach holder tunnel disposed over said ways and said conveyor supported on said frame, a broach extending longitudinally of said ways and disposed in said tunnel in parallel spaced relationship thereto, a plurality of work holders adapted to carry work to be broached internally mounted in longitudinal spaced relationship on said chain conveyor formed to travel on and along said ways, said work having an aperture therein disposed in alignment with said broach and of sufficient size to admit of said work being telescoped over the lead end of said broach, at least two pairs of broach holder jaws reciprocatingly mounted laterally through said tunnel at each of the lead end and the tail end of said broach supporting said broach parallel to said ways, means sequentially opening and closing each said pair of broach holder jaws permitting said work holders and work to pass therethrough with at least one of the pairs of broach holder jaws adjacent each end of said broach engaging said broach at all times, formations on said broach for interengagement between said broach holder jaws and said broach at the lead end of said broach holding said broach against longitudinal movement in addition to supporting it responsive to the closing of either of said pairs of broach holder jaws at the lead end of the broach.

References Cited by the Examiner
UNITED STATES PATENTS

| | | | |
|---|---|---|---|
| 1,295,957 | 3/19 | Blanchard | 90—86 |
| 1,933,080 | 10/33 | Stainfield | 90—86 |
| 2,357,094 | 8/44 | Edgar | 90—64 |
| 3,110,227 | 11/63 | Croucher | 90—64 |

WILLIAM W. DYER, JR., *Primary Examiner.*